(12) United States Patent
Kilibarda

(10) Patent No.: US 8,304,681 B2
(45) Date of Patent: Nov. 6, 2012

(54) UNIVERSAL WELD GUN CONFIGURATION

(75) Inventor: Velibor Kilibarda, Birmingham, MI (US)

(73) Assignee: Comau, Inc., Southfield, MI (US)

( * ) Notice: Subject to any disclaimer, the term of this patent is extended or adjusted under 35 U.S.C. 154(b) by 1092 days.

(21) Appl. No.: 12/207,534

(22) Filed: Sep. 10, 2008

(65) Prior Publication Data

US 2009/0071943 A1    Mar. 19, 2009

Related U.S. Application Data

(60) Provisional application No. 60/972,091, filed on Sep. 13, 2007.

(51) Int. Cl.
*B23K 11/11* (2006.01)
*B23K 11/31* (2006.01)

(52) U.S. Cl. .................. 219/86.25; 219/86.33; 219/86.8

(58) Field of Classification Search ............... 219/86.25, 219/86.33, 86.8
See application file for complete search history.

(56) References Cited

U.S. PATENT DOCUMENTS

| | | | |
|---|---|---|---|
| 1,635,583 A * | 7/1927 | Mradowcroft | 219/86.8 |
| 2,041,913 A * | 5/1936 | Fassler | 219/86.33 |
| 4,233,488 A | 11/1980 | Schwartz | |
| 4,410,782 A * | 10/1983 | Konno et al. | 219/89 |
| 4,861,959 A | 8/1989 | Cecil | |
| 5,142,118 A | 8/1992 | Schlatter | |
| 5,252,801 A | 10/1993 | Angel et al. | |
| 6,596,958 B1 * | 7/2003 | Chase | 219/86.25 |
| 6,870,121 B2 * | 3/2005 | Beauregard et al. | 219/86.25 |
| 7,968,815 B2 * | 6/2011 | Murai et al. | 219/86.25 |
| 2002/0125219 A1 * | 9/2002 | Janssens et al. | 219/86.41 |
| 2003/0089684 A1 | 5/2003 | Beauregard et al. | |
| 2004/0045939 A1 * | 3/2004 | Angel | 219/116 |
| 2004/0045940 A1 * | 3/2004 | Angel | 219/116 |
| 2007/0228018 A1 * | 10/2007 | Murai et al. | 219/86.25 |
| 2008/0173619 A1 | 7/2008 | Scodeller et al. | |

FOREIGN PATENT DOCUMENTS

EP            1657018 A1    5/2006
* cited by examiner

*Primary Examiner* — Joseph M Pelham
(74) *Attorney, Agent, or Firm* — Young Basile

(57) ABSTRACT

A weld gun in which the first weld arm is fixedly but removably connected to the weld gun body and the second weld arm includes a first arm segment, pivotally mounted at one end thereof on the gun body and pivotally connected at another end thereof to the gun actuator, and a second arm segment fixedly but removably connected atone end thereof to an intermediate portion of the first arm segment. Conversion of the gun from an X axis configuration to a Y axis configuration is achieved by removing the second arm segment from the first arm segment, removing the first weld arm from the body, rotating the second arm segment and the first weld arm through 90°, attaching the first arm to the first arm segment, and connecting the second arm segment to the body.

20 Claims, 5 Drawing Sheets

UNIVERSAL WELD GUN CONFIGURATION

BACKGROUND OF THE INVENTION

This invention relates to weld guns and more specifically to a single weld gun design that will accommodate both X axis and Y axis weld gun configurations as well as the entire spectrum of weld gun arm orientations from 0 to 90 degrees between the horizontal and vertical configurations.

Weld guns typically have a design that is dedicated to a particular axis configuration, most typically an X axis configuration or a Y axis configuration, and typically cannot be converted from one axis configuration to another axis configuration without a substantial tear-up of the gun involving an expenditure of time and money rendering the conversion impractical. Since many welding applications, including motor vehicle body shop welding applications, require weld guns having a variety of weld gun axes, conventional, dedicated weld gun designs require maintaining large inventory of various weld axis configurations.

SUMMARY OF THE INVENTION

The invention relates to a method and apparatus for providing a weld gun that is readily convertible between a plurality of weld gun axes.

The weld gun of the invention is of the type including a body, a first weld arm carrying a first weld tip, a second weld arm carrying a second weld tip, and an actuator carried by the body and operative to impart relative movement to the weld arms to position the weld tips on opposite sides of a work piece.

According to an important feature of the invention methodology, the arm members are removably connected to the remainder of the gun and, with the arm members configured at a first angle with respect to the remainder of the gun to provide a first axis gun, the arm members are removed from the remainder of the gun and the arm members are interchanged with the interchanged arms members removably positioned at a second, different angle with respect to the remainder of the gun to provide a second axis gun.

According to a further feature of the invention methodology, the second arm member is formed of a different length than the first arm member by an extent to allow the weld tips to be positioned proximate one another in either axis of the weld gun.

According to a further feature of the invention methodology, a third arm member is provided; the third arm member is pivotally mounted on the body and is connected to the actuator; the first arm member is fixedly but removably connected to the body; and the second arm member is fixedly but removably connected to the third arm member.

According to a further feature of the invention methodology, the third arm member is connected at one end thereof to the actuator and is pivotally mounted at another end thereof to the body; and an end of the second arm member remote from the second weld tip is removably connected to an intermediate location on the third arm member.

According to a further feature of the invention methodology, the weld gun further includes a transformer carried by the body, a first shunt having a first end electrically connected to the transformer and a second end electrically connected to a first edge face of the first arm member, and a second shunt having a first end electrically connected to the transformer and a second end electrically connected to a first edge face of the second arm member, and the method includes the further steps of providing on each arm member a second edge face proximate the first edge face but at an angle with respect to the first edge face; disconnecting the second ends of the shunts from the first end edges of the arm members at such time as the arm members are disconnected from the body; and connecting the second ends of the shunts to the second edge faces of the arm members as the arm members are reconnected to the body.

Further features of the invention relate to systems and apparatus for carrying out the above-identified methodology features.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
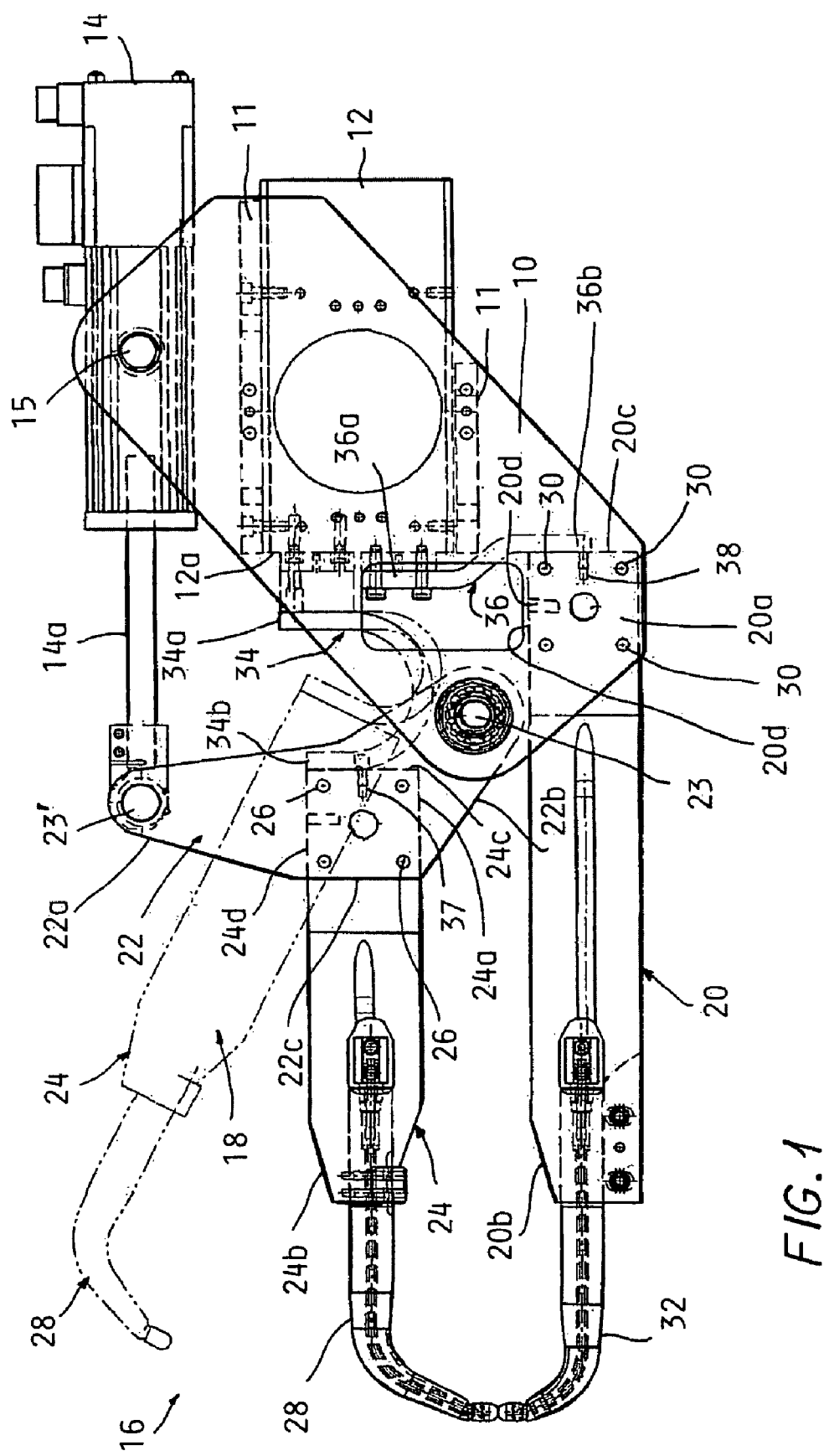
FIG. 1 is a side elevational view showing the invention weld gun outfitted with a horizontal or X axis weld gun configuration.

The invention weld gun includes a weld gun body comprising spaced side plates 10 of generally rectangular configuration interconnected by suitable reinforcing and spacing members 11; a transformer 12 positioned between the side plates between the reinforcing and spacing members 11; an actuator 14 (either hydraulic or pneumatic) pivotally mounted at 15 to an upper region of the weld plates between the weld plates and a weld arm assembly 16.

The weld arm assembly 16 includes a movable or pivotal arm 18 and a fixed arm 20.

Pivotal arm 18 includes a first arm segment in the form of spaced bellcranks 22 and a second arm segment 24.

The bellcranks 22 forming the first arm segment are pivotally secured at their upper ends 22a by a pivot pin 23' to the free end of piston rod 14a of actuator 14 and are pivotally mounted at their lower ends 22b by a pivot pin 23' to a lower region of side plates 10 between the plates.

Second arm segment 24 comprises a flat bar member having an inboard end 24a fixedly but removably positioned between the intermediate portions 22c of bellcranks 22 utilizing rectangularly spaced bolts or dowels 26. A weld tip 28 is fixedly secured to the outboard end 24b of arm segment 24.

The inboard end 20a of fixed arm 20 is fixedly secured to and between a lower region of spaced plates 10 utilizing rectangularly spaced bolts or dowels 30. A weld tip 32 is fixedly secured to the outboard end 20b of arm 20.

A first flexible shunt 34 of U configuration extends from transformer 12 to arm segment 24 and a second shunt 36 of S configuration extends from transformer 12 to arm 20.

Shunt 34 includes an inboard end 34a suitably electrically connected to the inboard face 12a of transformer 12 and an outboard end 34b electrically connected to inboard end edge face 24c of arm segment 24 utilizing, for example, an electrically conductive fastener 37.

Shunt 36 includes an inboard end 36a suitably electrically connected to transformer inboard face 12a and an outboard end 36b electrically connected to inboard end edge face 20c of arm 20 utilizing, for example, an electrically conductive fastener 38.

With this arrangement, as best seen in FIG. 1 illustrating a horizontal or X-axis weld gun configuration, arm segment 24 and arm 20 extend horizontally in parallel relation from body 10 and suitable actuation of actuator 14 moves moveable arm 18 about the axis of pin 23 between the solid line position of FIG. 1 and the dotted line position of FIG. 1 to facilitate an X-axis welding operation with the arm movement facilitated by flexing of the shunt 34.

Figure 2:
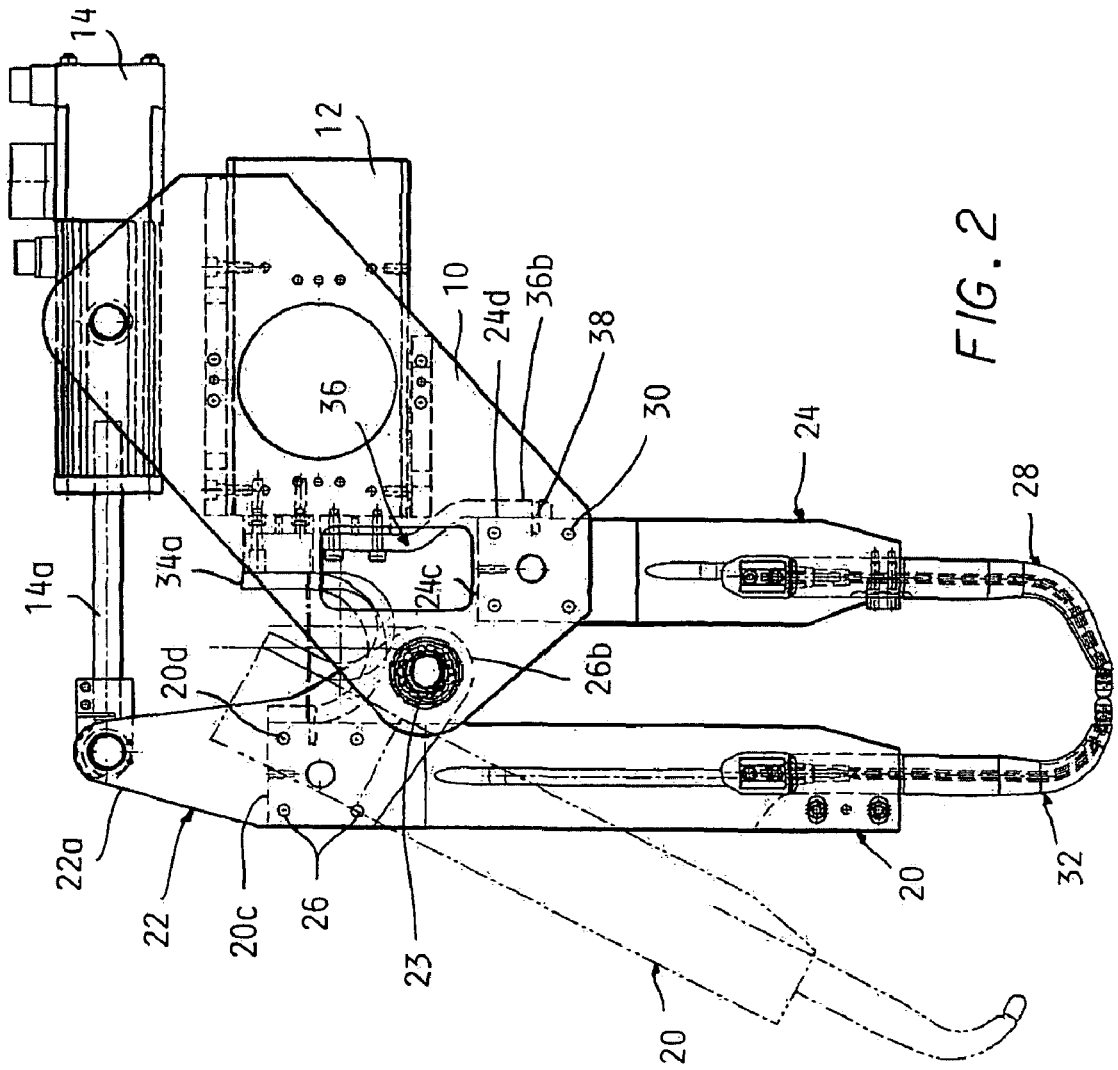
FIG. 2 is a side elevational view showing the invention weld gun outfitted with a vertical or Y axis weld gun configuration.

To convert the weld gun from the X axis configuration seen in FIG. 1 to the Y axis configuration seen in FIG. 2, bolts or dowels 26 and 30 are removed; fastener 37 is loosened to electrically disconnect the outboard end 34b of shunt 34 from end edge face 24c of arm segment 24; fastener 38 is loosened to electrically disconnect the outboard end 36b of shunt 36 from the end edge face 20c of arm 20; arm segment 24 is separated from arm segment 22; arm 20 is separated from body 10; the inboard end 24a of arm segment 24 is secured to body 10 utilizing bolts or dowels 30 with the arm segment extending vertically downwardly with respect to the body 10; fastener 38 is tightened to electrically connect the outboard end 36b of shunt 36 to outside edge 24d of arm segment 24; the inboard end of arm 20 is secured to the intermediate portion 22c of bellcranks 22 utilizing bolts or dowels 26 with the arm extending vertically downwardly with respect to the body 10 in parallel relation to arm segment 24 to position weld tips 28/32 in opposing relation; and fastener 37 is tightened to electrically connect the outboard end 34b of shunt 34 to side edge 20c of arm 20.

The conversion from X axis configuration to Y axis configuration will be seen to essentially involve interchanging the arm 20 and the arm segment 24 and rotating arm 20 and arm segment 24 90° with respect to their X axis configuration, while turning each arm over to place the weld tips 28/32 in confronting relationship. With this Y axis configuration, suitable actuation of actuator 14 moves arm 20 about the axis of pin 23 between the solid line position of FIG. 2 and the dotted line of FIG. 2.

Note that the conversion of the weld gun from an X axis configuration to a Y axis configuration has been achieved by simply removing the bolts or dowels 26/30, disconnecting the shunts, exchanging the arm segment 24 for the arm 20, reconnecting the bolts or dowels, and reconnecting the shunts. The conversion has not required any tear-up of the weld gun and, more specifically; the mounting of the actuator on the body has not been disturbed, the connection of the actuator to the arm segment 22 has not been disturbed, the mounting of the transformer on the body has not been disturbed, and the electrical connection of the shunts to the transformer has not been disturbed.

Figure 3:
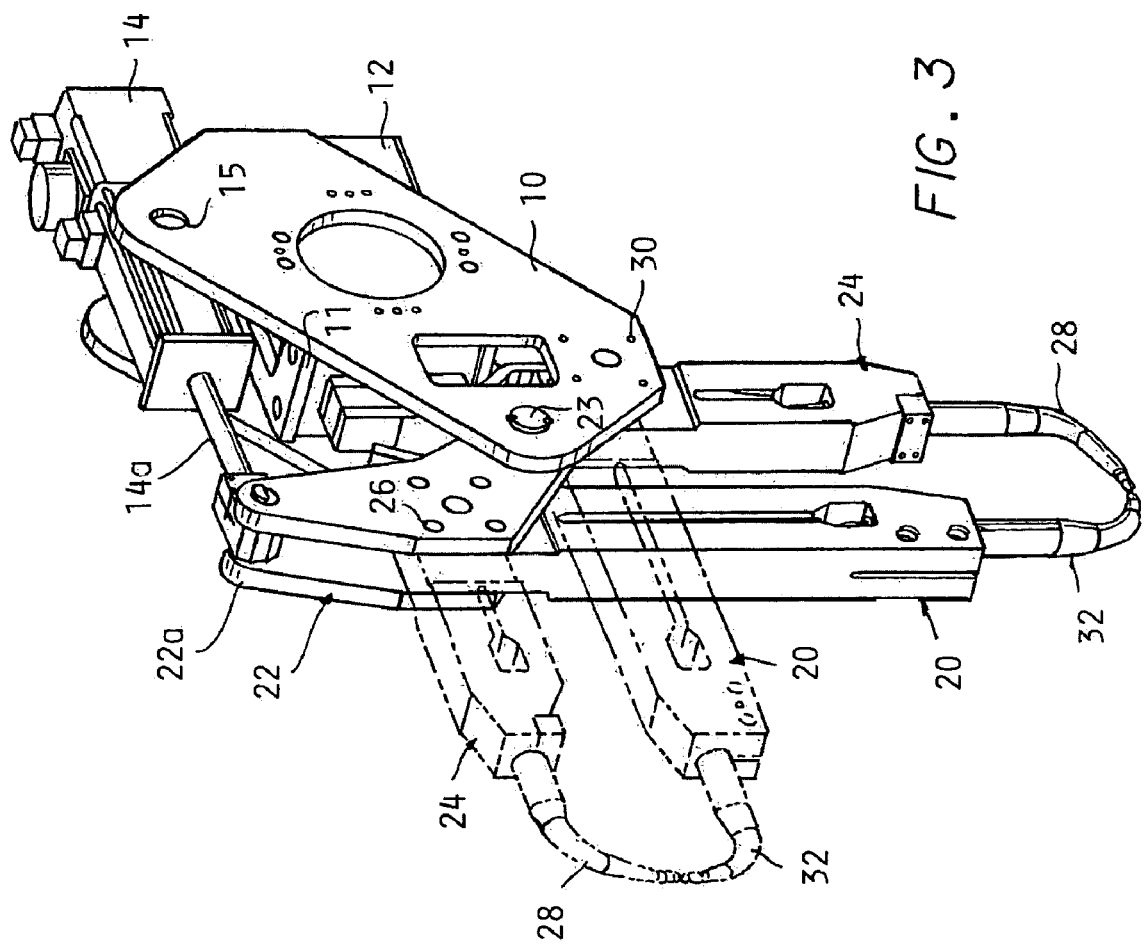
FIG. 3 is a perspective view, of the invention weld gun showing, for schematic illustrative purposes only, the weld gun outfitted with both a horizontal (phantom line) and vertical (solid line) weld gun configuration.
Figure 4:
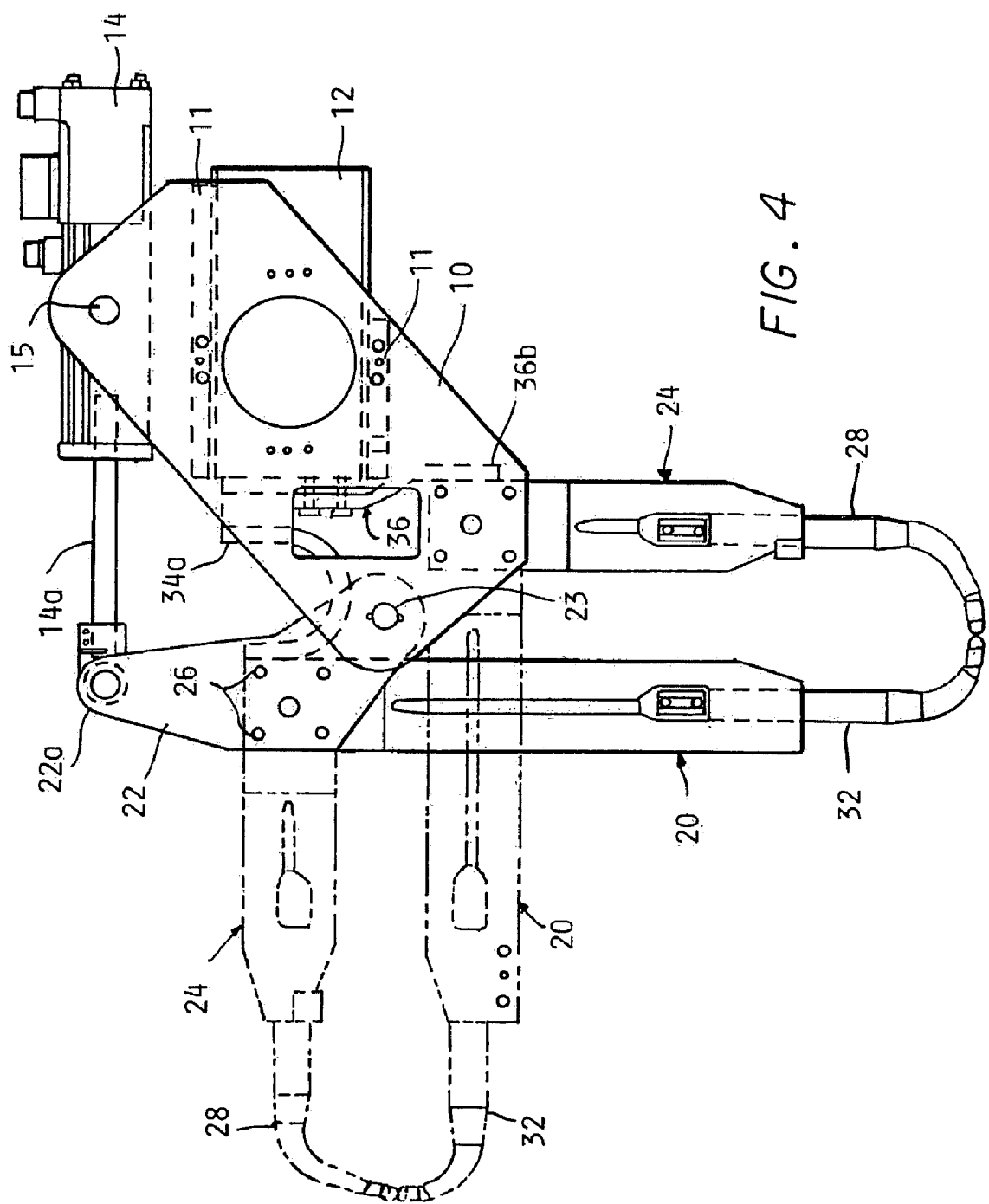
FIG. 4 is a side elevational view of the invention weld gun showing, again for schematic illustrative purposes only, the weld gun outfitted with both a horizontal (phantom line) and a vertical (solid line) weld gun configuration.
Figure 5:
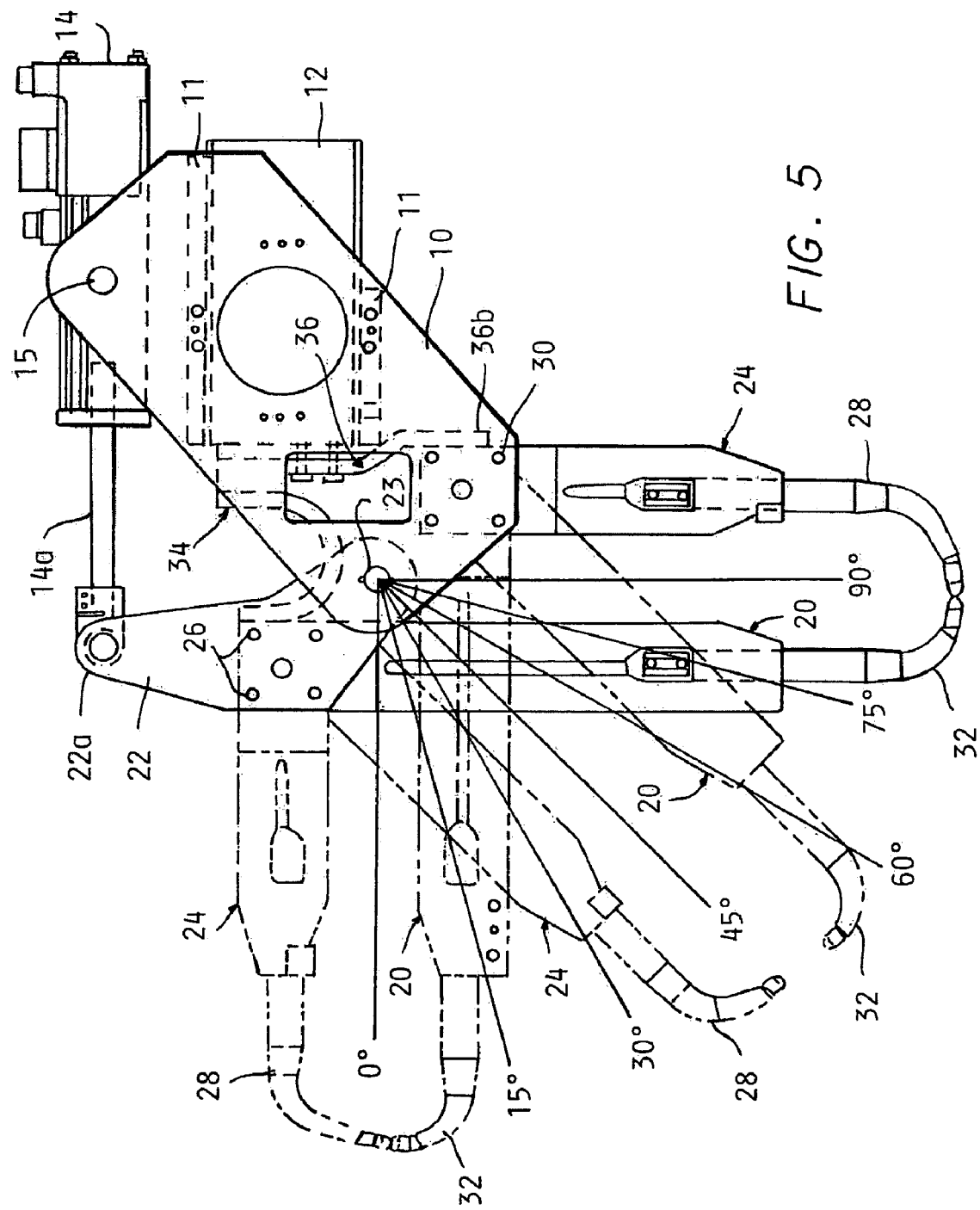
FIG. 5 is a side elevational view showing, again for schematic illustrative purposes only, the invention weld gun equipped with both a horizontal (phantom line) and a vertical (solid line) gun configuration, and further illustrating the ability of the gun to accommodate an intermediate (phantom line) weld gun configuration.

FIGS. 3, 4 and 5 illustrate, for schematic illustrative purposes only, the manner in which the same weld gun body is able to accommodate both a horizontal gun assembly and a vertical gun assembly. FIG. 5 further illustrates the manner in which the weld gun design of the invention is able to accommodate not only a horizontal or X axis weld gun configuration and a vertical or Y axis weld gun configuration, but also weld gun configurations positioned at intermediate positions between the X axis and the Y axis configurations. For example, it will be seen that the weld gun arm intermediate configuration seen in FIG. 5 can be readily accomplished, without interchanging arm segment 24 and arm 20, simply by customizing the inboard ends of the arm segment 24 and arm 20 to suitably receive the bolts or dowels 26/30 and to suitably mate with the outboard ends of the shunts so that the shunts need not be modified to accommodate any specific weld gun orientation, but rather the same shunts may be used to accommodate all weld gun arm orientations either horizontal, vertical or any position in between.

The invention will be seen to provide an apparatus and methodology for readily converting a weld gun from an X axis configuration to a Y axis configuration, thereby eliminating the need to maintain a separate inventory of X axis and Y axis weld guns.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. For use with a weld gun including a body, an actuator, a first arm member carrying a first weld tip and a second arm member carrying a second weld tip, a method of facilitating conversion of the weld gun from a first axis gun to second axis gun comprising:

removably connecting the arm members of the gun to a remainder of the gun; and with the arm members configured at a first angle with respect to the remainder of the gun to provide a first axis gun, removing the arm members from the remainder of the gun and interchanging the arm members with the interchanged arm members removably positioned at a second, different angle with respect to the remainder of the gun to provide a second axis gun.

2. A method according to claim 1 including the further step of forming the second arm member of a different length than the first arm member by an extent to allow the weld tips to be positioned proximate one another in either axis of the weld gun.

3. A method according to claim 1 including the further steps of:

providing a third arm member;

pivotally mounting the third arm member on the body;

connecting the third arm member to the actuator; and fixedly but removably connecting the first arm member to the body and the second arm member to the third arm member.

4. A method according to claim 3 including the further steps of:

connecting one end of the third arm member to the actuator;

pivotally mounting another end of the third arm member to the body; and removably connecting an end of the second arm member remote from the second weld tip to an intermediate location on the third arm member.

5. For use with a weld gun having a body, an actuator, a first weld arm fixedly attached at one end thereof to the body and carrying a first weld tip at a free end thereof, and a second arm pivotally mounted on the body, carrying a second weld tip and connected to the actuator, a method of allowing a change of weld axis without disturbing the connection of the actuator to the second weld arm comprising:

removably attaching the one end of the first weld arm to the body;

forming the second weld arm as a first arm segment, connected at one end thereof to the actuator and pivotally mounted at another end thereof on the body, and a second arm segment, fixedly but removably attached at one end thereof to an intermediate portion of the first arm segment and carrying the second weld tip at a free other end thereof;

removing the first weld arm from the body;

removing the second arm segment from the first arm segment and mounting the second arm segment on the body in place of the first weld arm but at a different angle with respect to the body; and mounting the first weld arm on the first arm segment in place of the second arm segment but at a different angle with respect to the first arm segment, and in generally parallel relation to the second arm segment.

6. A method according to claim 5 wherein the method includes the further step of forming the second arm segment shorter than the first weld arm by an extent to allow the weld tips to be positioned proximate one another in either axis of the weld gun.

7. For use with a weld gun comprising a weld gun body, a first weld arm member carrying a first weld tip and extending from the body at a first angle, a second weld arm member carrying a second weld tip and extending from the body at the first angle and generally parallel to the first weld arm member to establish a first weld gun axis, an actuator mounted on the body and operative to impart relative movement to the weld arm members to facilitate movement of the weld tips to positions on opposite faces of a work piece, a transformer carried by the body, a first shunt having a first end electrically connected to the transformer and a second end electrically connected to a first edge face of the first weld arm member, and a second shunt having a first end electrically connected to the transformer and a second end electrically connected to a first edge face of the second weld arm member, a method of converting the weld gun from the first weld gun axis to a second different weld gun axis, the method comprising:

on each weld arm member, providing a second edge face proximate the first edge faces but at an angle with respect to the first edge faces;

providing a removable connection of the weld arm members to the body;

disconnecting the weld arm members from the body;

disconnecting the second ends of the shunts from the first end edge faces of the weld arm members;

reconnecting the weld arm members to the body at a second different angle to the body; and connecting the second ends of the shunts to the second edge faces of the weld arm members.

8. A method according to claim 7 wherein the first and second weld arm members are interchanged prior to being reconnected to the body.

9. A weld gun comprising a weld gun body, a first weld arm carrying a first weld tip, a second weld arm including an arm segment carrying a second weld tip, an actuator mounted on the body and operative to impart relative movement to the weld arms to facilitate movement of the weld tips to positions on opposite faces of a work piece, characterized in that:

the gun includes mounting structures operative to allow the first weld arm and the arm segment to be selectively mounted on the gun in a first position wherein the first weld arm and the arm segment extend in generally parallel relation to each in a first direction relative to the body to achieve a first weld gun axis and a second position wherein the first weld arm and the arm segment extend in generally parallel relation to each other in a second, different direction relative to the body to achieve a second, different weld gun axis.

10. A weld gun according to claim 9 wherein:

the actuator is operatively connected to the second weld arm and is operative to move the second weld arm relative to the first weld arm; and the connection of the actuator to the second weld arm is identical, irrespective of whether the first weld arm and the arm segment are in their first position or their second position.

11. A weld gun according to claim 9 wherein:

the arm segment comprises a second arm segment;

the second weld arm further includes a first arm segment pivotally mounted at one end thereof on the body and connected to another end thereof to the actuator; and the second segment is removably secured proximate one end thereof to the first arm segment intermediate the ends of the first arm segment.

12. A weld gun according to claim 11 wherein, with the first weld arm and the second arm segment in their first positions, the second segment extends from the first arm segment at a first angle and in the second positions of the first weld arm and the second arm segment, the second arm segment extends from the first segment at a second, different angle.

13. A weld gun according to claim 12 wherein the first weld arm is fixedly but removably mounted on the body and in its first position extends from the body at a first angle in parallel relation to the second arm segment and in its second position extends from the body at a second different angle in parallel relation to the second arm segment.

14. A weld gun according to claim 9 wherein the mounting structures are operative to allow the first weld arm and the arm segment to be interchanged so that, to achieve the second weld gun axis with the weld gun in the first weld gun axis, the arm segment is positioned in place of the first weld arm but at a different angle relative to the body and the first weld arm is positioned in place of the arm segment but at a different angle relative to the body.

15. A weld gun comprising a body, an actuator mounted on the body, a first weld arm fixedly secured at one end thereof to the body and extending at an angle with respect to the body and carrying a first weld tip at a free end thereof, and a second weld arm pivotally mounted on the body, connected to the actuator, and carrying a second weld tip, characterized in that:

the first weld arm is removably attached at one end thereof to the body;

the second weld arm includes a first arm segment and a second arm segment;

the first arm segment is connected to the actuator and pivotally mounted on the body;

the second arm segment is fixedly but removably attached to the first arm segment, carries the second weld tip at a free end thereof, and extends at an angle with respect to the first arm segment and generally parallel to the first weld arm to position the second weld tip proximate the first weld tip, wherein the second arm segment is shorter than the first arm whereby, to achieve a different weld axis without disturbing the connection of the actuator to the first arm segment, the second arm segment may be removed from the first arm segment, the first arm removed from the body and mounted on the first arm segment in place of the second arm segment but at a different angle with respect to the first arm segment, and the second arm segment mounted on the body in place of the first arm but at a different angle with respect to the body in generally parallel relation to the first arm segment.

16. A weld gun according to claim 15 wherein:
the first arm segment is pivotally mounted at one end thereof on the body and connected at another end thereof to the actuator; and
the second arm segment is removably attached to the first arm segment intermediate the ends of the first arm segment.

17. A variable axis weld gun having a universal pair of opposed side plates, an actuator and a transformer operably connected to the side plates, the variable axis weld gun comprising:
a first weld arm connected to the body and carrying a first weld tip at a free end thereof, the first weld arm is operatively and selectively connected at one end thereof to one of the actuator or the side plates between a first axis gun position and a second axis gun position angularly separated from the first axis gun position with respect to the side plates through a range of about 90 degrees; and
an opposing second weld arm pivotally mounted on the body with respect to the first weld arm, operably connected to the actuator, and carrying a second weld tip, the second weld arm is operably and selectively connected to the other of the one of the actuator or the side plates not connected to the first weld arm between a first axis gun position and a second axis gun position angularly from the first axis gun position with respect to the side plates through a range of about 90 degrees, wherein the second axis gun position is located within a range of about 90 degrees from the first axis gun position with respect to the side plates, and the first and second weld arms can be operably disconnected, angularly moved with respect to the side plates and reconnected to the side plates to change the gun axis.

18. The variable axis weld gun according to claim 17 further comprising a first shunt having a first end electrically connected to the transformer and a second end selectively connected to one of the first weld arm or the second weld arm depending on the angular position of the weld arms with respect to the body, and a second shunt having a first end electrically connected to the transformer and a second end selectively connected to the other of the one of the first weld arm or the second weld arm not connected to the first shunt, wherein:
the first and second weld arms can be operably disconnected, angularly moved with respect to the side plates and reconnected to the side plates to change the gun axis without having to disconnect the ends of the first and second shunts from the transformer.

19. The variable axis weld gun according to claim 18 further having a bellcrank positioned between one of the first weld arm and the second weld arm and the actuator, the bellcrank including an end connected to the actuator, an opposing end pivotally connected to the side plates and an intermediate portion positioned between the ends, wherein the bellcrank pivotally rotates the first or the second arm connected at the bellcrank intermediate portion to and from the other arm on movement on selected movement of the actuator.

20. The variable axis weld gun according to claim 19 wherein the second arm is shorter than the first arm whereby, to achieve a different weld axis without disturbing the connection of the actuator to the bellcrank, the second arm may be removed from the bellcrank, the first arm removed from the side plates and mounted on the bellcrank in place of the second arm but at a different angle with respect to the side plates, and the second arm mounted on the side plates 10 in place of the first arm but at a different angle with respect to the side plates in generally parallel relation to the first arm.

* * * * *